Patented Dec. 17, 1946

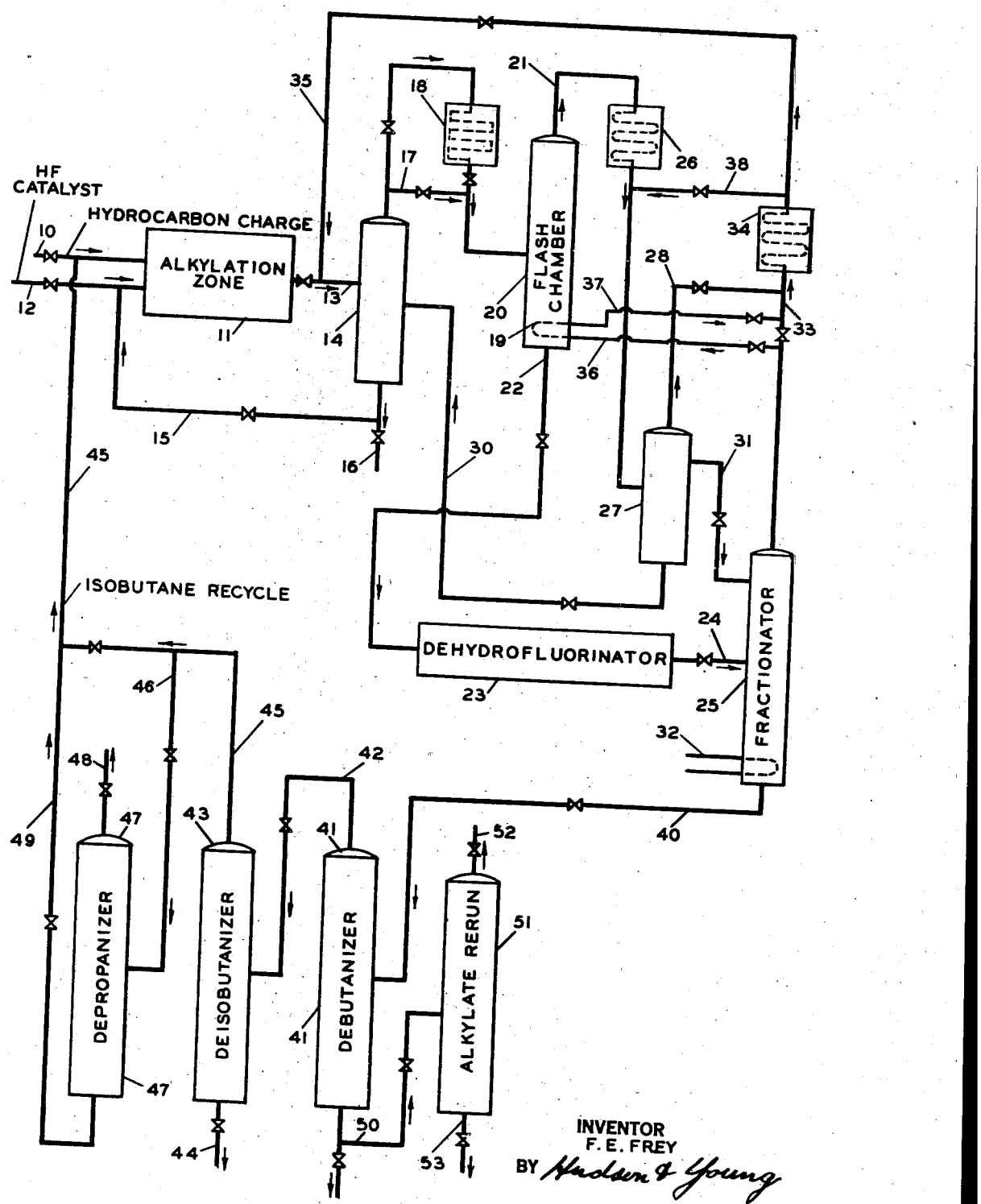

2,412,726

UNITED STATES PATENT OFFICE 2,412,726

FLUORINE REMOVAL PROCESS

Frederick E. Frey, Bartlesville, Okla., assignor to Phillips Petroleum Company, a corporation of Delaware Application October 16, 1944, Serial No. 558,941

5 Claims. (Cl. 260—683.4)

This invention relates to the treatment of organic materials to remove therefrom organic fluorine-containing compounds. In one general embodiment it relates to the removal from hydrocarbon materials of fluorine-containing compounds. In one of its specific embodiments this invention relates to the removal of both hydrogen fluoride and of organically bound fluorine from hydrocarbon mixtures such as are produced by alkylation.

In the presence of suitable catalysts, alkylatable hydrocarbons react with unsaturated hydrocarbons or other suitable alkylating reactants to produce higher boiling hydrocarbons. The reaction, which is known as alkylation, is promoted especially well by hydrofluoric acid. This catalyst yields excellent results with isoparaffins or other branched chain paraffins and particularly paraffins with at least one tertiary carbon atom per molecule and with olefins having more than two carbon atoms per molecule. However, under especially favorable circumstances other paraffins and/or olefins may react. Besides paraffins, other alkylatable hydrocarbons, such as aromatic hydrocarbons, can be reacted with an alkylating reactant in the presence of hydrofluoric acid to produce higher boiling hydrocarbons. Suitable alkylating reactants for the alkylation of either paraffins or aromatics include olefins, relatively polar nonprimary alkyl compounds, such as tertiary and secondary alkyl halides, advantageously fluorides and chlorides, alcohols, and the like. The hydrofluoric acid preferably should be above about 80 per cent in strength and will generally be used with a strength greater than 90 per cent; it is most advantageous when it is substantially anhydrous, or about 99 to 100 per cent in strength.

Because of its nonoxiding character, hydrofluoric acid does not produce the oxidation by-products that are formed in alkylation with such catalysts as sulfuric acid. Furthermore, hydrofluoric acid is relatively free from the tendency to form complex tarry addition products that are formed in alkylation with certain other catalysts. However, hydrofluoric acid is appreciably soluble in saturated hydrocarbons and its use as a catalyst presents a problem of recovery that is not involved when other catalysts are used.

In such alkylation processes small proportions of organic fluorine-containing by-products are also formed. Generally the entire hydrocarbon mixture which can be separated from effluents of such an alkylation will contain organically bound fluorine in an amount not greater than about 1 per cent by weight, and often the amount will not be greater than about 0.01 to about 0.05 per cent by weight. Although the exact natures and compositions of these organic fluorine-containing by-products have not been definitely established, they are believed to be predominantly alkyl and/or aryl fluorides. They are not completely removed by washing the hydrocarbon materials with aqueous alkali solutions, such as aqueous solutions of sodium hydroxide or sodium carbonate. Some of them apparently are the alkyl fluorides which result from the addition of hydrogen fluoride to the olefin used as the alkylating reactant, or to replacement of a hydroxyl group or of another halogen atom by fluorine when other akylating reactants such as alcohols or chlorides are used in the alkylation reaction. These have boiling points which are not substantially higher than the corresponding olefins. Other organic fluorine-containing compounds are higher boiling and are to be found in various fractions which have boiling points throughout the usually accepted motor fuel boiling range, that is, up to about 400° F. The various organic fluorine-containing compounds tend to decompose at elevated temperatures, especially the higher boiling ones, and often decompose during fractional distillation of the hydrocarbon products, thereby contributing to the problems of commercial operation, particularly problems relating to the combating and control of corrosion in distillation equipment. Likewise, their presence in motor fuel products decreases the desirable characteristics of such products.

In some commercial operations wherein alkylation is utilized to produce large quantities of hydrocarbons in the motor fuel range it is common practice first to remove dissolved free hydrogen fluoride from hydrocarbon effluents of the alkylation and subsequently to treat the entire hydrocarbon mixture to remove all organic fluorine compounds therefrom. Since a large portion of these compounds correspond to the original alkylating reactants and can be returned to the alkylation step as a part of the charged alkylating reactant, such treatment often includes the removal of fluorine from unnecessary quantities of the organic impurities. In other instances such a hydrocarbon mixture, after the removal of free hydrogen fluoride is subjected to fractional distillation to separate various hydrocarbon fractions and one or more of the alkylate fractions are treated to remove fluorine compounds. When such treatment involves dehydrofluorination with the production of free hydrogen fluoride additional treating equipment is necessary to effect removal of such free hydrogen fluoride.

I have now found that efficient removal of higher-boiling organic fluorine-containing compounds can be effected by a dehydrofluorination and free hydrogen fluoride so produced can be removed efficiently, together with removal of free hydrogen fluoride which is dissolved in liquid hydrocarbon effluents of the alkylation step, by vaporizing a substantial portion of such hydrocarbon effluents so that most or all of the dissolved hydrogen fluoride and a large portion of unreacted hydrocarbons, together with low-boiling alkyl fluorides, are removed as vapors, the unvaporized residue is treated to effect a removal of organically combined fluorine, preferably in a dehydrofluorination step, effluents of this treatment are passed to a fractional distillation, vapors from the vaporization step are cooled and condensed and passed to the same fractional distillation, and a hydrocarbon material free from free hydrogen fluoride and free from high-boiling organic fluorine compounds is recovered as a high-boiling product of said distillation.

An object of this invention is to effect removal of fluorine from hydrocarbon materials containing organic fluorine compounds as impurities.

A further object of this invention is an improved process for obtaining a substantially fluorine-free alkylate from the alkylation of hydrocarbons in the presence of a catalyst comprising hydrogen fluoride.

Another object of my invention is to remove organic fluorine compounds from other organic materials.

A further object of my invention is to effect a selective removal of higher-boiling fluorine compounds from effluents of an alkylation process.

Other objects and advantages of my invention will become apparent to one skilled in the art from the accompanying disclosure and discussion.

My invention will now be further discussed and illustrated by a specific embodiment thereof, in connection with the accompanying drawing showing diagrammatically an arrangement of apparatus which may be used in the practice of a preferred modification of my process.

A suitable hydrocarbon charge, such as an isobutane-butylene mixture containing a molar excess of isobutane and generally also containing appreciable amounts of normal butane and other substantially inert hydrocarbons, is passed through pipe 10 to alkylation zone 11. A hydrogen fluoride catalyst is passed through pipe 12 to alkylation zone 11, wherein it is mixed with the hydrocarbon charge under alkylation conditions such as are well known to the art. Thus, as an example, the molar ratio of isobutane to butylenes will be between about 3:1 and about 10:1, the liquid volume ratio of hydrocarbons to hydrofluoric acid catalyst will be about 1:1 and these materials will be intimately admixed at a temperature of about 80 to 115° F. for a reaction period between about 5 and about 20 minutes. If desired, particularly when a normal paraffin is one of the alkylation reactants, a small amount of boron trifluoride may be added as a promoter, generally in an amount between about 1 and about 10 per cent by weight of the hydrofluoric acid catalyst. Effluents of alkylation zone 11 are passed through pipe 13 to separator 14 wherein a separation is effected between hydrocarbon effluents, preferably as a liquid hydrocarbon mixture, and liquid hydrofluoric acid. The hydrofluoric acid is removed through pipe 15 and is returned at least in part to alkylation zone 11. Generally it is also desirable to pass a portion of this used catalyst to purification equipment, not shown, through pipe 16. The liquid hydrocarbon mixture which is separated in separator 14 will comprise a substantial amount of unreacted reactant, low-boiling hydrocarbons such as isobutane, an appreciable but minor amount of normally liquid hydrocarbons produced by the alkylation process, a small but definite amount of dissolved hydrogen fluoride and a still smaller amount of fluorine present as organic fluorine compounds. As an example, when isobutane is alkylated with butenes in the presence of concentrated hydrofluoric acid as the alkylation catalyst a total hydrocarbon phase has been obtained which contains well over 50 per cent by volume of unreacted isobutane, about 10 to 20 per cent by volume of alkylate, between about 0.3 and 2.0 per cent by weight of dissolved hydrogen fluoride, and between about 0.01 and about 0.15 weight per cent of fluorine present as organically bound fluorine, of which half to two-thirds is present as butyl fluorides. Such a liquid mixture is passed through pipe 17 to flash chamber 20 wherein a vaporization of a large portion of the more volatile constituents is effected, including substantially all of the dissolved free hydrogen fluoride. It is generally desirable to supply a substantial amount of heat to aid in this vaporization. This may be obtained by passing the liquid hydrocarbon material through heater 18 and/or by means of a heating coil 19 in the bottom of flash chamber 20. Satisfactory operation is generally obtained by a simple flashing with separation of vapors through pipe 21 and of liquid through pipe 22. However, in some instances it may be found more desirable to aid this flashing by including a small amount of conventional packing, or a few bubble trays, so as to insure substantially complete absence of alkylate from the vapors passing through pipe 21 and to reduce the amount of low-boiling hydrocarbons, such as butane, present in the unvaporized liquid passing through pipe 22. This unvaporized liquid will contain substantially all of the alkylate, together with higher-boiling organic fluorine compounds which are deleterious to the alkylate. This material is passed through to the dehydrofluorimator 23 wherein it is treated under suitable dehydrofluorination conditions, such as will be more fully discussed hereinafter, to decompose these organic fluorine compounds into hydrocarbons and free hydrogen fluoride. Effluents of the dehydrofluorination are passed through pipe 24 to fractionator 25, which may be a single fractional distillation column. In such a case these effluents are preferably passed to an intermediate portion of the column.

Vapors from flash chamber 20 are passed through pipe 21 and cooler and condenser 26 to an accumulator 27, which may serve as a simple surge tank for the resulting condensate. However, since this material contains substantially all of the hydrogen fluoride contained in the hydrocarbons passing through pipe 17 and has an appreciable smaller content of hydrocarbons in most instances, a separate liquid hydrofluoric acid phase often forms in accumulator 27. If such is the case this separates and can be removed through pipe 30 and can be returned to separator 14. The liquid hydrocarbon material collected in accumulator 27 and containing dissolved hydrogen fluoride is passed through pipe 31 to fractionator 25. When fractionator 25 is a single distillation column, as previously discussed, this liquid hydrocarbon stream can be added near the top of the column as a liquid reflux. Heat for the distillation may be furnished by a suitable heating means, illustrated by heating coil 32. Any uncondensed vapors, such as a propane-hydrogen fluoride mixture, may be removed from accumulator 27 through pipe 28 and passed to pipe 33.

A low-boiling fraction comprising all of the free hydrogen fluoride which is present, both in the stream passing through pipe 24 and in the stream passing through pipe 31, is removed through pipe 33 and may be passed through cooler and condenser 34 and pipe 35 to pipe 13 and separator 14. As more fully discussed in my Patent 2,322,800, issued June 29, 1943, this material will be accompanied by an appreciable amount of low-boiling hydrocarbons. If desired, a portion of this vapor stream may be diverted from pipe 33 through pipe 36 to heating coil 19 in order to supply heat to the vaporizing material in flash chamber 20 and the material, somewhat cooled by the vaporization taking place in flash chamber 20, is returned to pipe 33 through pipe 37. Also, if desired, a portion of the cooled and condensed overhead product from fractionator 25 may be passed to accumulator 27 through pipe 38.

From the bottom of fractionator 25 a hydrocarbon mixture, which is substantially free from free hydrogen fluoride and is also substantially free from higher-boiling organic fluorine compounds, is recovered and is treated to separate various desired fractions. Thus it may be passed through pipe 40 to debutanizer 41 wherein normal butane and lighter hydrocarbons are separated from heavier normally liquid hydrocarbons, including the alkylate produced in the alkylation zone 11. The low-boiling fraction from debutanizer 41 is passed through pipe 42 to deisobutanizer 43. From the bottom of deisobutanizer 43 normal butane is recovered through pipe 44 for any subsequent treatment as may be desired, such as dehydrogenation to olefins for use in alkylation zone 11 and/or isomerization into isobutane for use in alkylation zone 11. From the top of deisobutanizer 43 an isobutane fraction is removed through pipe 45 and may be recycled to alkylation zone 11. This fraction will comprise an appreciable amount of butyl fluorides present in effluents of the alkylation zone, since these will have been vaporized in flash chamber 20 and will not have been subjected to a dehydrofluorination. Since, in commercial processes, some propane will tend to accumulate in the system, particularly if propylene or propyl fluoride is present in the charge to the alkylation step and if the reaction conditions are such that this propylene or propyl fluoride takes up hydrogen to form propane as two molecules of isobutane unite to form an octane, a portion of this isobutane recycle stream may be diverted from pipe 45 through pipe 46 to depropanizer 47. A low-boiling fraction comprising propane is discarded from the system through pipe 48 and a purified isobutane stream is returned to pipe 45 through pipe 49.

An alkylate fraction is removed from the bottom of debutanizer 41 and may be passed through pipe 50 to rerun column 51 wherein a light alkylate fraction is separated from a heavier alkylate fraction. This light alkylate fraction may be recovered for use as a motor fuel stock through pipe 52 and a heavy alkylate fraction is recovered through pipe 53.

It will be readily appreciated by those skilled in the art that the drawing illustrates the use of conventional equipment which is not shown in detail, and that much conventional equipment such as heaters, coolers, condensers, reflux equipment, pumps, compressors, catalyst chambers, and the like, will be necessary in the practice of any specific embodiment of my invention and can readily be adapted by one skilled in the art in the light of the teachings and discussion presented herein.

The flashing of volatile constituents can be conducted most simply by heating the liquid material passing through pipe 17, in heater 18, and passing the heated stream into a simple flash chamber. Thus, when isobutane present in a butane mixture is reacted with butylenes present in a refinery butane-butylene fraction, in the presence of a hydrofluoric acid alkylation catalyst, the liquid hydrocarbon effluent separated from the catalyst has a composition as shown in the first column of the accompanying table, at a separation temperature of about 88° F. and a pressure of about 35 pounds gage. When this material is heated to about 100° F. and flashed, in a simple flash chamber, down to this same pressure, the amount of material vaporized and remaining liquid, and the composition of the vapor and liquid, will be as shown in the table under the heading corresponding to this temperature. Similar data are also shown for heating the stream to 105° F. and to 115° F. prior to flashing.

| Mol per cent of effluent | Liquid 100 | 100° F. | | 105° F. | | 115° F. | |
|---|---|---|---|---|---|---|---|
| | | Vapor 42 | Liquid 58 | Vapor 55 | Liquid 45 | Vapor 68 | Liquid 32 |
| Composition: | | | | | | | |
| Propane | 5.3 | 8.9 | 2.7 | 7.6 | 2.4 | 6.9 | 1.9 |
| Isobutane | 33.3 | 40.0 | 28.5 | 29.4 | 25.8 | 38.5 | 22.1 |
| N. butane | 46.6 | 46.3 | 46.8 | 48.7 | 44.1 | 50.0 | 39.2 |
| Isopentane | 1.5 | 0.9 | 1.9 | 0.9 | 2.2 | 1.2 | 2.2 |
| N. pentane | 0.7 | 0.2 | 1.0 | 0.4 | 1.1 | 0.4 | 1.3 |
| Light alkylate | 10.5 | 0.0 | 18.1 | 0.2 | 23.2 | 0.6 | 31.9 |
| Heavy alkylate | 0.4 | 0.0 | 0.7 | 0.0 | 0.9 | 0.0 | 1.2 |
| HF | 1.6 | 3.6 | 0.2 | 2.7 | 0.2 | 2.3 | 0.1 |
| Organic fluorides | 0.1 | 0.1(−) | 0.1(+) | 0.1 | 0.1 | 0.1(+) | 0.1(−) |
| | 100.0 | 100.0 | 100.0 | 100.0 | 100.0 | 100.0 | 100.0 |

A somewhat more desirable separation is effected by supplying a substantial portion of the heat of vaporization to the bottom of the flash chamber, as by means of a heating coil 19. By the use of only two or three bubble-trays the amount of butane and lighter (including hydrogen fluoride) present in the liquid and of pentanes in the vapors, particularly at the higher-temperatures, can be decreased without adding greatly to the expense of the operation. As will be appreciated, such a flashing operation can also be aided by means of a pump in pipe 22 and of a compressor in pipe 21, whereby flash chamber 20 can be operated at a lower pressure than subsequent equipment. Although the amount of organic fluorides in the vapor and in the liquid phases in the preceding flashing operations are not markedly different, the vaporized fluorides are primarily volatile compounds which can be satisfactorily recycled and the unvaporized compounds are undesirable compounds normally present in the alkylate.

The dehydrofluorination step is conducted by passing the hydrocarbon material which contains organic fluorine-containing impurities into contact with a suitable dehydrofluorination catalyst under conditions such that most, or all, of the organic fluorine compounds are decomposed to form fluorine-free compounds and free hydrogen fluoride. This can generally be accomplished by passing the impure hydrocarbon material either in the liquid or vapor phase, preferably in the liquid phase, through the catalyst at a space velocity of 1 to 10 volumes of liquid per volume of catalyst per hour. The temperature in the catalyst chamber is preferably between 150 and 350° F., but temperatures as low as 75° F. and as high as 750° F. or higher may be used. The pressure is preferably sufficient to maintain the hydrocarbon in the liquid phase. For treating any particular impure hydrocarbon material optimum conditions can be readily determined by trial, in the light of the discussion and disclosure presented herein.

The dehydrofluorination catalyst is preferably contained in a suitable catalyst chamber as a mass of solid granular material, although other modifications of using solid catalysts which are known in the oil cracking art or the like may be employed if desired. As the dehydrofluorination catalyst various alkaline earth fluorides, various metals such as aluminum, magnesium, iron or nickel or salts of such metals such as the fluorides or sulfates may be used. Catalysts which are particularly active and useful in the practice of my process are the oxides of metals which have been treated with hydrogen fluoride as has been more fully disclosed and discussed by me in my copending application Serial No. 510,203, filed November 13, 1943. These novel catalytic materials are prepared by treating various oxides of metals with hydrogen fluoride, or with a material which will release hydrogen fluoride under the conditions used for treating the metal oxide. An especially desirable catalyst results from treating a more or less hydrous oxide of aluminum with hydrogen fluoride at a suitable temperature. Other desirable catalysts can be produced by similar treatment of oxides of iron, chromium, nickel, cobalt, zirconium, molybdenum, titanium, vanadium, manganese, thorium, tungsten, uranium, hafnium, or the like, alone or in admixture, synthetically produced or in natural occurring forms, as in ores. When using naturally occurring oxides, such as bauxite, limonite, manganite, baddeleyite, brookite, brucite, diaspore, dysanalite, gibbsite, goethite, hausmannite, huebnerite, ilmenite, lepidocrocite, rutile, spinel, valentinite, etc. it is generally desirable to choose an ore relatively free from substantial amounts of silica, although minor amounts are not deleterious, and often are advantageous, since a more porous granular material results from removal of the silica.

This treatment is preferably carried out at a temperature between about 50 and about 350° F. One method is to effect a substantial, but not complete, dehydration of the oxide, which generally will be available in a more or less hydrous condition. After such dehydration the oxide may be treated directly with liquid concentrated hydrofluoric acid for a period of several hours. Too short a treatment results in a less active catalyst, too long a treatment often has the result that the original granules disintegrate to the extent that the resulting material has too low a mechanical strength for handling. It is often more convenient to place the granular oxide in the catalyst chamber and to pass through the granular mass a stream of liquid concentrated hydrofluoric acid, or a hydrocarbon stream containing free hydrogen fluoride. Bauxite or other granular oxide material, which has been used in the manner disclosed in my Patent 2,347,945, issued May 2, 1944, can also be employed as a dehydrofluorination catalyst. However, it is generally desirable to give the used oxide material a further treatment with hydrofluoric acid before employing it as a dehydrofluorination catalyst. Still another preferred dehydrofluorination catalyst is produced from yellowish ferric oxide either in the form of limonite or in the form resulting from the oxidation with air of wet iron. Such a material should then be treated with hydrogen fluoride as previously discussed.

It will be readily appreciated that various modifications, and embodiments of my invention may be practiced, by one skilled in the art, by following the teachings of the present disclosure without departing from the spirit thereof or from the scope of the claims.

I claim:
1. In a process for reacting isobutane with a butylene under alkylation conditions in the presence of a hydrofluoric acid alkylation catalyst, the improvement which comprises passing effluents of such an alkylation to a separating zone and separating as a liquid the hydrocarbon content thereof from liquid hydrofluoric acid, passing a resulting liquid hydrocarbon material containing dissolved hydrogen fluoride to a flash vaporization zone under conditions that substantially all said dissolved hydrogen fluoride and a substantial portion of unreacted isobutane are vaporized and such as to leave unvaporized substantially all of the alkylate product, subjecting said unvaporized material to a dehydrofluorination to decompose organic fluorine compounds contained therein as impurities forming free hydrogen fluoride and hydrocarbons, passing effluents of said dehydrofluorination to a fractional distillation zone, cooling and condensing said vaporized dissolved hydrogen fluoride and unreacted isobutane and passing a resulting isobutane-containing condensate to said fractional distillation zone, and recovering from said fractional distillation zone a low-boiling fraction comprising free hydrogen fluoride together with at least a sufficient quantity of a normally gaseous paraffin hydrocarbon to form a minimum-boiling azeotropic mixture therewith and as a high-boiling fraction a hydrocarbon material free from hydrogen fluoride and comprising unreacted isobutane and alkylate.

2. In a process for the reaction of an alkylating reactant with a low-boiling paraffin hydrocarbon in the presence of a hydrofluoric acid alkylation catalyst, the improvement which comprises passing effluents of such an alkylation to a separating zone and separating as a liquid a hydrocarbon phase from liquid hydrofluoric acid, passing a resulting liquid hydrocarbon material containing dissolved hydrogen fluoride to a vaporization zone and vaporizing same therein under conditions such as to vaporize a substantial portion of unreacted low-boiling paraffin hydrocarbon and substantially all of said dissolved hydrogen fluoride and such as to leave unvaporized substantially all of the alkylate product, subjecting said unvaporized material to a dehydrofluorination to decompose organic fluorine compounds contained therein as impurities forming hydrocarbons and free hydrogen fluoride, passing effluents of said dehydrofluorination to a fractional distillation zone, cooling and condensing said vaporized dissolved hydrogen fluoride and unreacted hydrocarbons and passing a resulting hydrocarbon-containing condensate to said fractional distillation zone, and removing from said fractional distillation zone a low-boiling fraction comprising free hydrogen fluoride and as a high-boiling fraction a hydrocarbon material comprising unreacted paraffins and alkylate.

3. A process for the removal of small amounts of dissolved hydrogen fluoride and high-boiling organic fluorine compounds from a liquid hydrocarbon mixture comprising primarily low-boiling and high-boiling hydrocarbons and said fluorine-containing impurities, which comprises passing such a hydrocarbon mixture to a vaporization zone under conditions such that substantially all said dissolved hydrogen fluoride and a substantial portion of said low-boiling hydrocarbons are vaporized and such as to leave unvaporized high-boiling hydrocarbons and high-boiling organic fluorine compounds, subjecting said unvaporized material to a dehydrofluorination to decompose said organic fluorine compounds contained therein forming free hydrogen fluoride and hydrocarbons, passing effluents of said dehydrofluorination to a fractional distillation, cooling and condensing said vaporized dissolved hydrogen fluoride and low-boiling hydrocarbons and passing a resulting hydrocarbon-containing condensate to said fractional distillation, and recovering from said fractional distillation a low-boiling fraction comprising hydrogen fluoride and a high-boiling fraction comprising both low-boiling and high-boiling hydrocarbons and substantially free from free hydrogen fluoride and high-boiling organic fluorine compounds.

4. In a process for alkylating a low-boiling paraffin hydrocarbon in the presence of a hydrofluoric acid alkylation catalyst, the improvement which comprises separating from effluents of such an alkylation a liquid hydrocarbon material comprising unreacted paraffin hydrocarbons and alkylate and dissolved hydrogen fluoride together with organic fluorine-containing compounds, vaporizing said material under conditions such that substantially all of said dissolved hydrogen fluoride and a substantial portion of said unreacted paraffin hydrocarbons are vaporized and substantially all of said alkylate together with high-boiling organic fluorine compounds remain unvaporized, passing a resulting unvaporized liquid to a dehydrofluorinating step and subjecting same therein to dehydrofluorination conditions to convert said organic fluorine compounds to hydrogen fluoride, passing effluents of said dehydrofluorination to a fractional distillation, cooling and condensing vapors from said vaporization and separating same into a liquid hydrocarbon phase and an undissolved liquid hydrogen fluoride phase, passing said liquid hydrocarbon phase to said fractional distillation as a reflux stream, and recovering from said fractional distillation a low-boiling fraction comprising free hydrogen fluoride and a high-boiling fraction comprising unreacted hydrocarbons and alkylate and free from free hydrogen fluoride.

5. In a process for the reaction of an alkylating reactant with a low-boiling isoparaffin hydrocarbon in the presence of a hydrofluoric acid alkylation catalyst wherein a portion of said alkylating reactant reacts with said hydrofluoric acid to form a low-boiling alkyl fluoride which is present in effluents of said alkylation, the improvement which comprises passing effluents of such an alkylation to a separating zone and separating as a liquid a hydrocarbon phase from liquid hydrofluoric acid, passing a resulting liquid hydrocarbon material containing dissolved hydrogen fluoride and said low-boiling alkyl fluoride to a vaporization zone and vaporizing same therein under conditions such as to vaporize a substantial portion of unreacted low-boiling isoparaffin hydrocarbon and substantially all of said dissolved hydrogen fluoride and low-boiling alkyl fluoride and such as to leave unvaporized substantially all of the alkylate product, subjecting said unvaporized material to a dehydrofluorination to decompose organic fluorine compounds contained therein as impurities forming hydrocarbons and free hydrogen fluoride, passing effluents of said dehydrofluorination to a fractional distillation zone, cooling and condensing said vaporized dissolved hydrogen fluoride and alkyl fluoride and unreacted isoparaffin hydrocarbons and passing a resulting hydrocarbon-containing condensate to said fractional distillation zone, removing from said fractional distillation zone a low-boiling fraction comprising free hydrogen fluoride and as a high-boiling fraction a hydrocarbon material comprising unreacted isoparaffins and alkylate and containing said low-boiling alkyl fluoride, and separating from said high-boiling fraction a low-boiling fraction comprising unreacted isoparaffin and alkyl fluoride and returning same to said alkylation.

FREDERICK E. FREY.